UNITED STATES PATENT OFFICE.

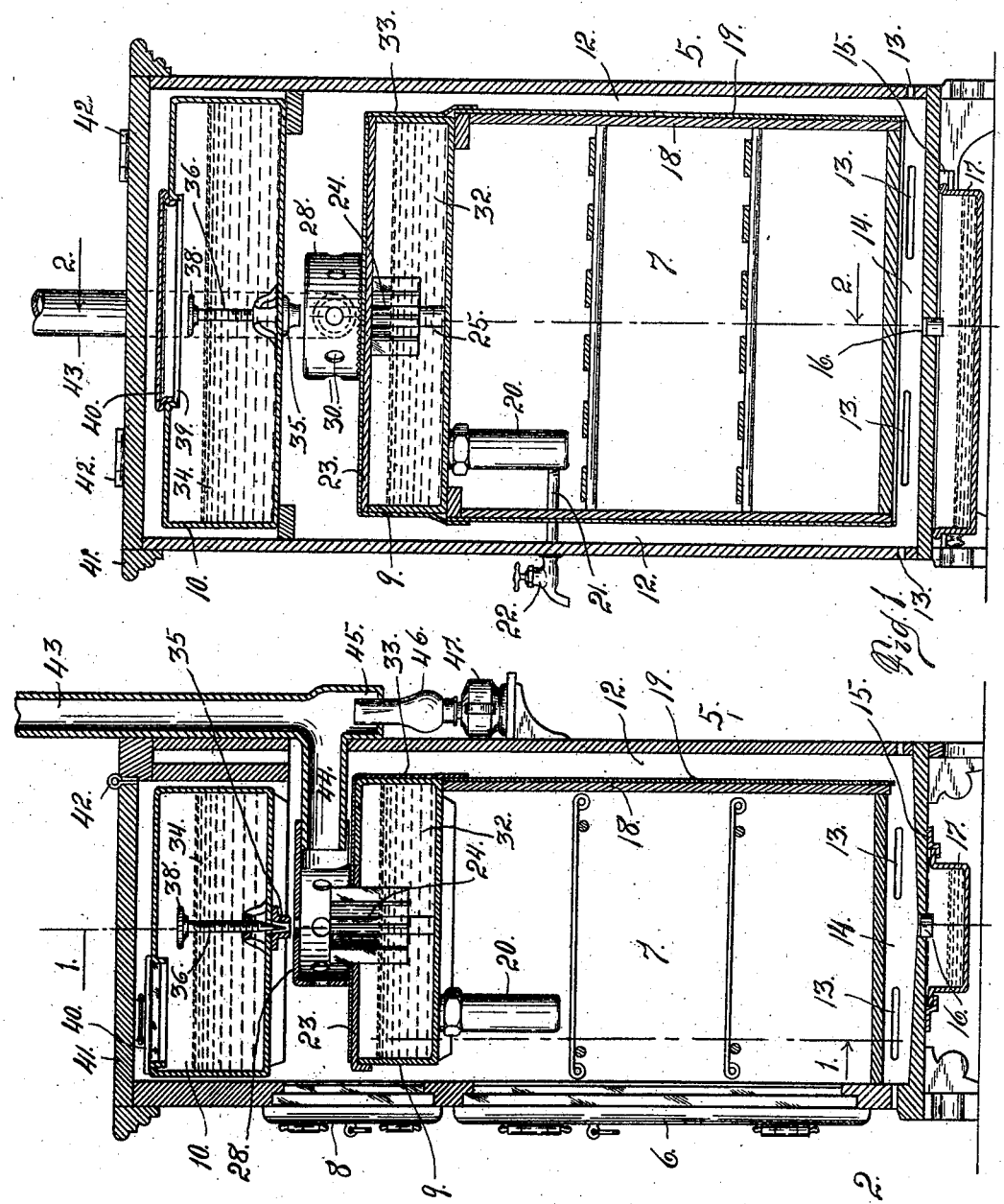

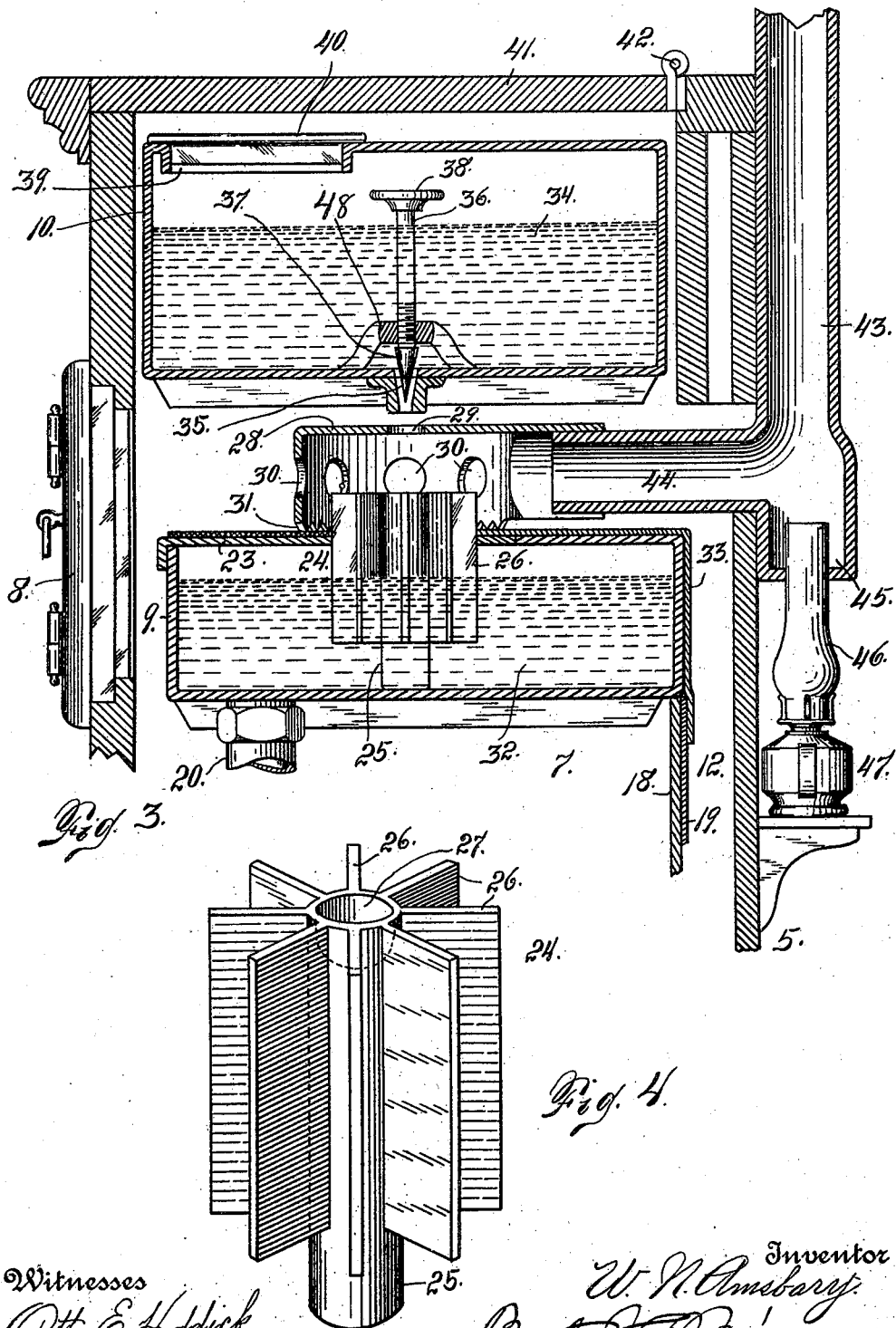

WILLIAM N. AMSBARY, OF DENVER, COLORADO, ASSIGNOR OF FIVE-TWELFTHS TO LYMAN D. DENNEY AND ONE-SIXTH TO WILLIAM SIMPSON, BOTH OF DENVER, COLORADO.

REFRIGERATOR.

944,353.  Specification of Letters Patent.  Patented Dec. 28, 1909.

Application filed November 10, 1908. Serial No. 461,940.

*To all whom it may concern:*

Be it known that I, WILLIAM N. AMSBARY, a citizen of the United States, residing in the city and county of Denver and State of Colorado, have invented certain new and useful Improvements in Refrigerators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in refrigerators in which the cooling function is performed on the principle of liquid evaporation.

For the purpose of facilitating the evaporation of the water within the apparatus, I make provision for increasing the circulation of air around the refrigerator or cooling chamber. In the specific construction disclosed in this application I place within the top of the receptacle a tank containing the water to be evaporated. In the bottom of this tank is formed an escape opening controlled by a needle valve. Below this tank is a receptacle containing drinking water whose top is closed and provided with a series of radially disposed metal plates connected with a central core. The top of the drinking water receptacle is perforated and slotted to receive this device which fits closely therein. This metallic member is preferably composed of copper since the latter possesses the quality of heat conductivity to a satisfactory degree. This metal device projects above the top of the drinking water receptacle and is covered by a removable housing whose lower edge is toothed or notched to allow the drip from the tank above to escape and spread itself over the top of the drinking water receptacle and run down the sides of the cooling chamber in a thin sheet where it is brought directly in contact with the induced current of air which passes upwardly around the cooling chamber and thence through the housing which is perforated for the purpose and thence into a flue which may be connected with the furnace flue of a house; or the circulation of air may be increased in any other suitable manner. In the drawing a lamp is shown having its chimney entering the lower part of the flue whereby the air is heated and its upward circulation increased.

Having briefly outlined my improved construction, I will proceed to describe the same in detail, reference being made to the accompanying drawing in which is illustrated an embodiment thereof.

In this drawing, Figure 1 is a vertical section taken through my improved apparatus on a plane parallel with the front and back thereof. This section may be approximately indicated by the line 1—1 on Fig. 2. Fig. 2 is a section taken on the line 2—2 Fig. 1, parts being left in elevation. Fig. 3 is a fragmentary section similar to Fig. 2 the parts, however, being shown on a larger scale. Fig. 4 is a perspective view in detail of the metallic element connected with the top of the water cooling tank shown on a larger scale than in the other views.

The same reference characters indicate the same parts in all the views.

Let the numeral 5 designate the outer casing of the refrigerator which casing may be of ordinary or any suitable construction. The front of this casing is provided with a door 6 which closes the cooling chamber 7; and a door 8 which closes an opening in the upper part of the refrigerator and in which are located the receptacle 9 and tank 10. Between the cooling chamber and the receptacle 9 and extending on three sides of the refrigerator, namely, the back and the two opposite sides, is a space 12 for the circulation of air which enters through slots 13 formed in the lower part of the casing, and communicating with a bottom space 14 located between the bottom of the cooling chamber and the bottom 15 of the casing. This bottom 15 is slightly inclined toward the center where an opening 16 is formed to allow the superfluous water, or that which is not evaporated, to pass into a receptacle 17 located underneath the apparatus.

The main wall 18 of the cooling chamber is provided with a thin layer or coating 19 composed of some dark substance. Mounted on top of the cooling chamber is the receptacle 9 for containing drinking water. Connected with the bottom of this receptacle is a water filter 20 which may be of any suitable construction. An outlet pipe 21 leads from this filter to an exteriorly exposed faucet or draw-off cock 22 mounted on one of the side walls of the apparatus. The upper part or top 23 of the receptacle 9 is removable and in this top is set a metallic element 24 which is fitted closely into the top 23 which is perforated for the purpose. As shown in the drawing this device 24 is composed of a core 25 from which wings 26 radiate. In the upper part of this core is a cup or receptacle 27 into which the water may drip from the tank above as hereinafter explained, and overflow upon the upper surface of the wings 26. This metal device projects upwardly above the top of the tank 9 and is normally covered by a housing 28 provided with an opening 29 in the top and side openings 30 to facilitate circulation of air. The lower edge of this housing is notched or toothed as shown at 31 to allow the water to spread out over the top of the receptacle 9 and run down upon the vertical walls thereof, and also upon the corresponding walls of the cooling chamber. This metallic device dips into the water 32 in the receptacle 9 and by virtue of its heat-conducting property, facilitates the escape of the heat from the water, or in other words, absorbs the heat and conducts it out of the receptacle and delivers it, so to speak, to the air which is constantly in circulation around the receptacle and the cooling chamber and passing out through the flue as hereinafter more fully described.

The top as well as the rear and side walls of the receptacle 9 may be provided with a covering 33 of absorbent material.

Directly above the receptacle 9 is located the tank 10 containing the water 34 used for evaporating purposes as heretofore intimated. In the bottom of this tank is an escape port 35 controlled by a needle valve 36 whose lower extremity is cone-shaped as shown at 37 to conform to the shape of the port 35. The top 38 of this valve projects above the level of the water in the tank whereby it is always accessible for purposes of adjustment. The top of this tank is provided with an opening 39 normally closed by a cover 40. The top 41 of the refrigerator is hinged as shown at 42.

Located outside of the upper portion of the refrigerator and projecting upwardly at the back thereof, is a flue 43 having a branch 44 which enters the refrigerator and communicates with the housing 28. This flue has a short bottom extension 45 having an opening to receive the chimney 46 of a lamp 47. The heat from this lamp being directed into the flue, produces an upward draft of air and increases the circulation of the air around the cooling chamber and the tank 9 within the refrigerator.

When the apparatus is in use, the needle valve which is threaded into a support 48, is adjusted to allow the water to drip from the tank 10 through the port 35. This water passes through the opening 29 in the housing 28 and thence falls into the cup 27 of the metal device 24 from which it overflows upon the wings 26 and spreads out over the top of the receptacle 9 and flows downwardly upon the back and side walls of the said receptacle and the corresponding walls of the cooling chamber, in a thin sheet where it is brought in contact with the rapidly upwardly directed air current, resulting in a maximum degree of evaporation and consequently producing the best refrigerating or cooling result.

Having thus described my invention, what I claim is:

1. A refrigerator comprising a casing, a cooling chamber therein and separated therefrom by an air space, a water-containing receptacle mounted in the casing, a metallic element fitted into an opening formed in said receptacle and protruding above the same, and means located within the casing for delivering water to the said metallic element, whereby it is allowed to pass downwardly therefrom to the wall of the cooling chamber.

2. A refrigerator comprising a casing, a cooling chamber therein separated therefrom by an air space, a water-containing receptacle mounted in the casing, a metallic element fitted into an opening formed in the top of the said receptacle and protruding above the same, a water-containing tank mounted above the said receptacle and provided with a valve-controlled opening to allow the water to drip downwardly upon the said metallic element and pass therefrom to the exterior wall of the cooling chamber.

3. A refrigerator comprising a casing, a cooling chamber located therein and separated therefrom by an air space, a water-containing tank mounted on top of the cooling chamber, a metallic element fitted into an opening formed in the top of the said tank, and protruding above the same, the said element being provided with a number of wings or plates to form a relatively large surface, a second water-containing tank mounted above the first named tank and provided with a valve controlled opening to allow the water to drip downwardly upon the said metallic element and pass therefrom to the exterior wall of the cooling chamber, substantially as described.

4. A refrigerator comprising a casing, a cooling chamber therein separated therefrom by an air space, a water-containing receptacle mounted in the casing above the cooling chamber, a metallic element projecting into the said receptacle and protruding therefrom, the receptacle being closed around the said element, and a water-containing tank mounted above the receptacle and provided with a valve controlled opening to allow the water to drip downwardly upon the said metallic element.

5. A refrigerator comprising an outer casing, a cooling chamber located within the casing and separated therefrom by an air space, means for producing a forced current of air through the said air space, a water receptacle located above the cooling chamber, a metallic element protruding into the said water receptacle and projecting above the top of the same, the said element being closely fitted into a suitable opening formed in the top of the receptacle, an apertured housing covering the protruding portion of the said metallic element, a water containing tank located above the water receptacle and provided with a bottom port in communication with an opening formed in the top of the said housing, whereby the water is allowed to drip from the tank downwardly upon the metallic element and distribute itself over the outer surface of the water receptacle and cooling chamber, substantially as described.

6. A refrigerator comprising an outer casing, a cooling chamber located within the said casing but separated therefrom by an air space to allow the circulation of air around the cooling chamber, a flue in communication with the upper portion of the said air space, means for producing a forced current of air through the said air spaces and flue, a water receptacle located above the cooling chamber, a metallic element projecting into the water containing receptacle and protruding from the top thereof, a housing covering said element and provided with openings to allow the air to circulate therethrough, a water-containing tank located above the receptacle and provided with a valve controlled port to allow the water to drip downwardly upon the said metallic element, the housing being provided with an opening for the purpose, substantially as described.

7. A refrigerator comprising an exterior casing, a cooling chamber, a drinking water receptacle located above the said chamber, a metallic element including a series of plates projecting into the said receptacle and protruding therefrom, a housing resting upon the top of said receptacle and covering the said element, the lower edge of the said housing being toothed and its upper portion being apertured to allow the air to circulate, and means for discharging water in limited quantities upon the protruding portion of the said metallic element, substantially as described.

8. A refrigerator including an outer casing, a cooling chamber located therein and separated therefrom by an air space, a water containing receptacle mounted in the casing adjacent to the cooling chamber and a metallic element projecting into said receptacle and protruding therefrom, the wall of the receptacle being closed around the said element, substantially as described.

In testimony whereof I affix my signature in presence of two witnesses.

WILLIAM N. AMSBARY.

Witnesses:
  LOUISE COSNER,
  A. EBERT O'BRIEN.